__United States Patent Office__

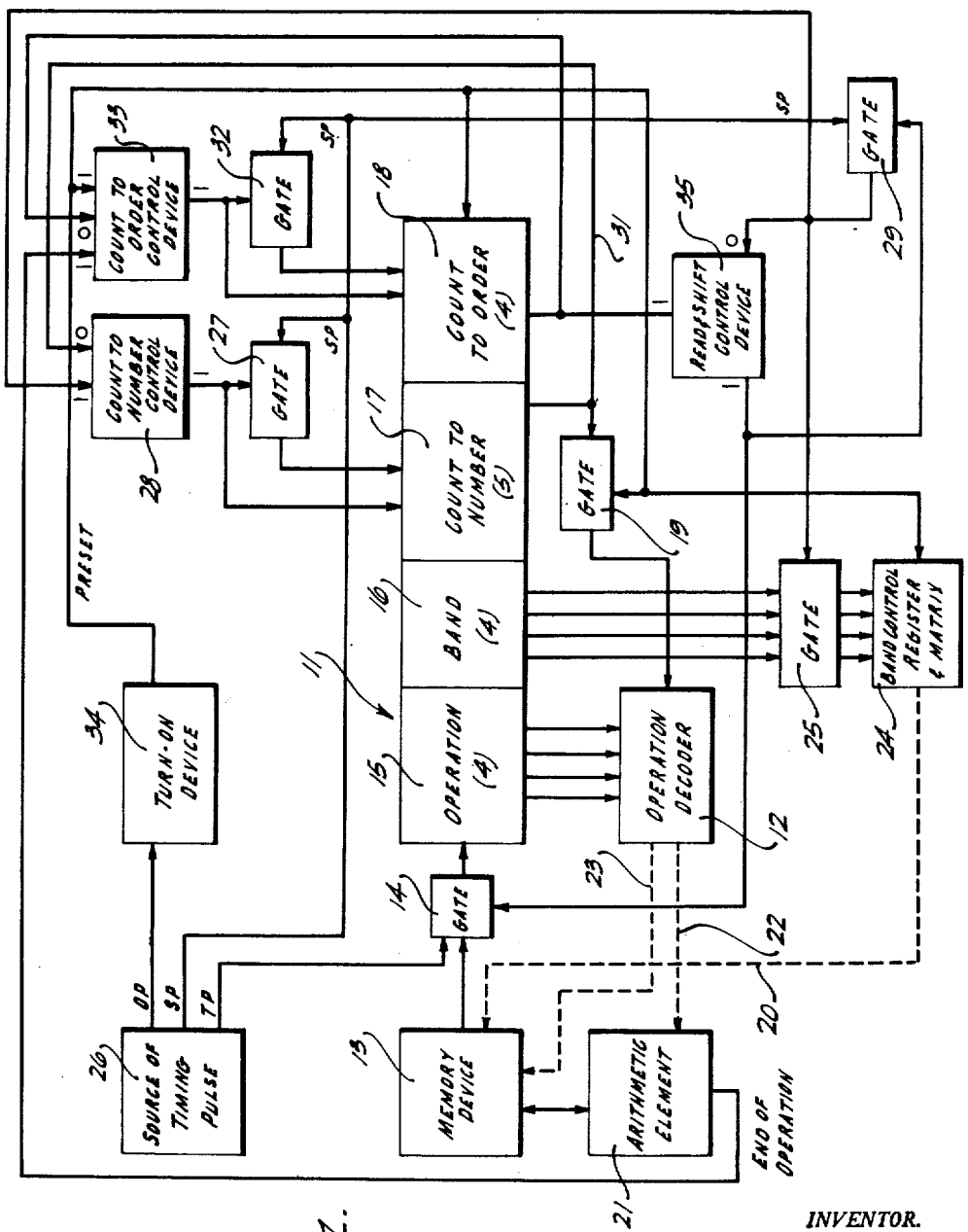

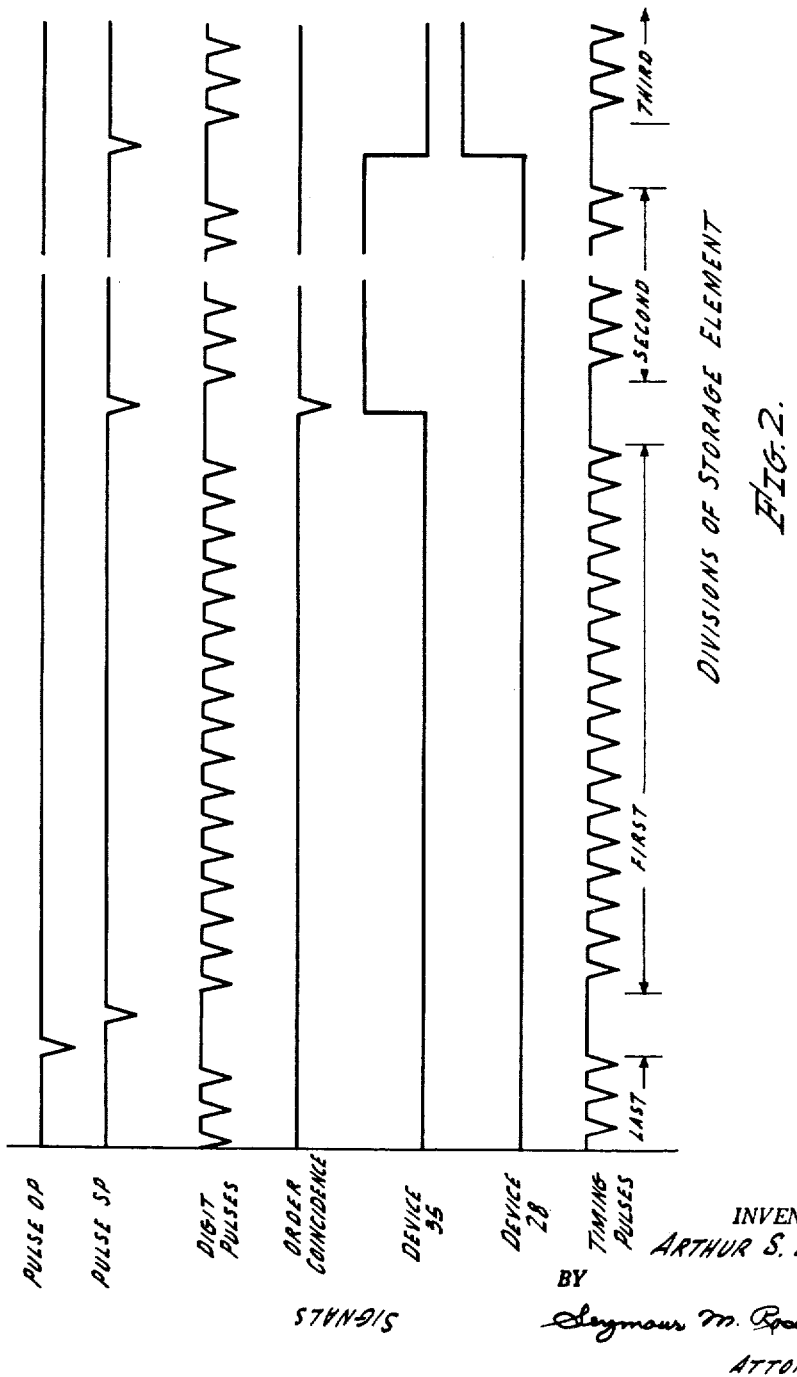

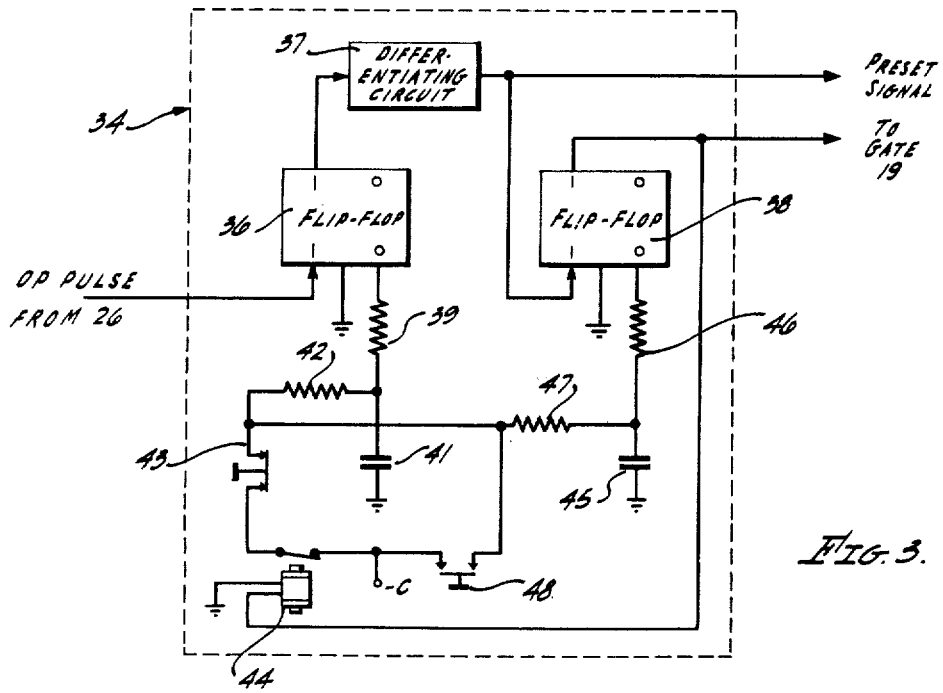
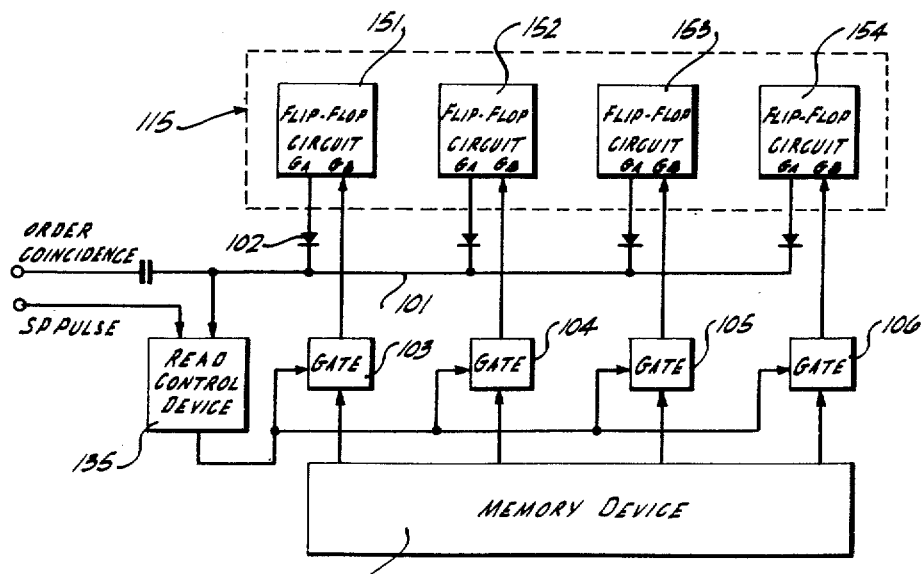

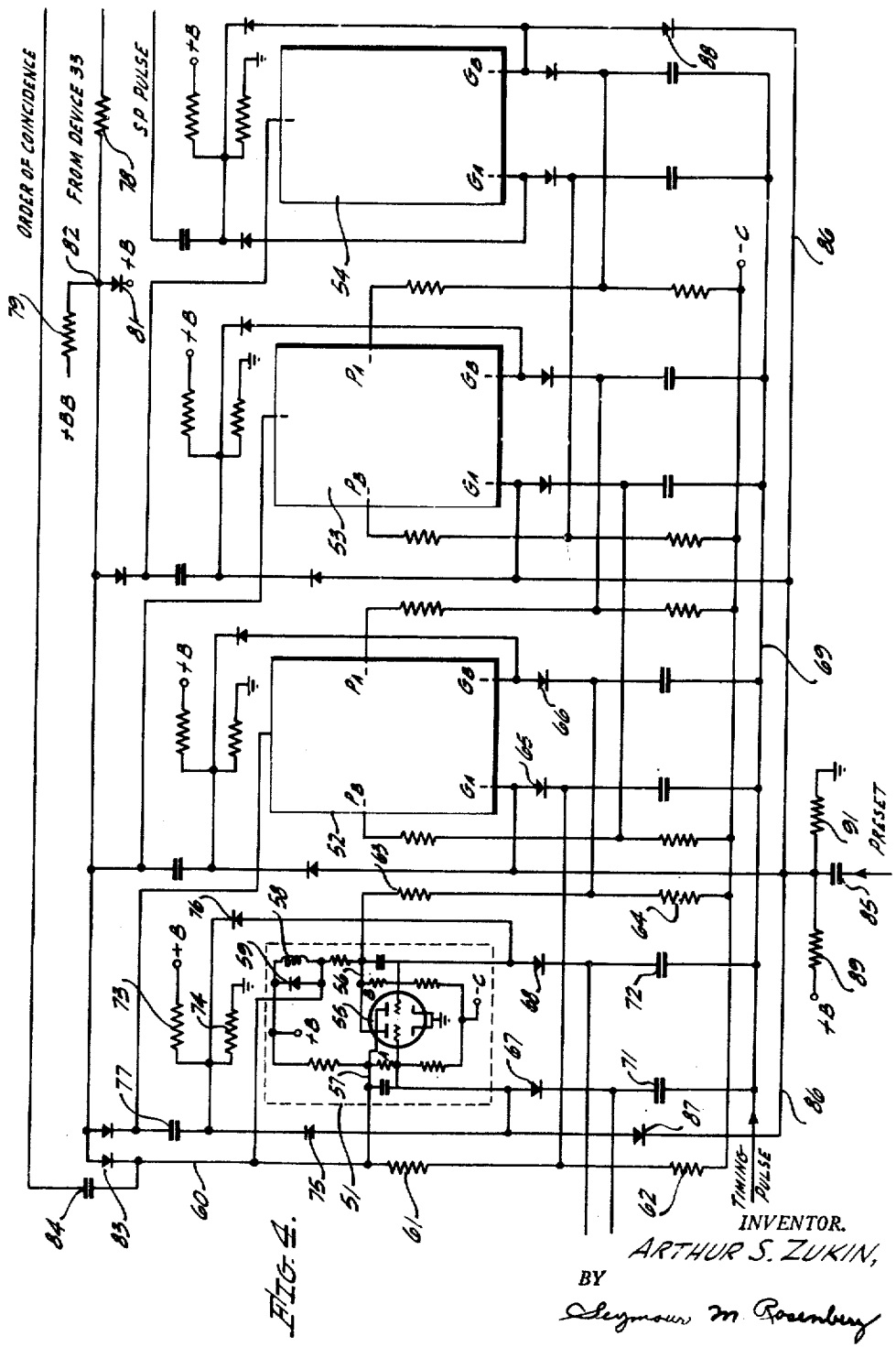

2,815,168
Patented Dec. 3, 1957

2,815,168

AUTOMATIC PROGRAM CONTROL SYSTEM FOR A DIGITAL COMPUTER

Arthur S. Zukin, Los Angeles, Calif., assignor, by mesne assignments, to Hughes Aircraft Company, a corporation of Delaware Application November 14, 1951, Serial No. 256,276

11 Claims. (Cl. 235—61)

The present invention relates to an automatic program control system for a digital computer, and more particularly to an automatic program control system for specifying the location of a desired word in the memory device of a digital computer and for transferring the specified word to and from the memory device.

Memory devices of digital computers generally include a cyclically operable storage element which has a plurality of divisions for storing digital information, and a transducing element for writing digital information into or reading digital information out of the storage element. The divisions of the storage element are sequentially available at the transducing element, and the digital information storable in each division is termed a "word," that is an arranged set of digits representing a particular number, a particular order, a particular part of an order, or a particular group of orders. The location of a division of the storage element with respect to the transducer element is termed the "address" of the division.

Since the storage element is capable of storing a plurality of words, it is the function of a program control system to indicate when a desired division is available at the transducing element and to transfer a word to or from the storage element. If the desired division contains an order, or a group of orders, the control system causes the computer to transfer the order from the storage element to a storage register. On the other hand, if the desired division contains a number, or is to receive a number, the control system performs the desired operation on this number.

In the prior art, digital computers have employed a "fixed reference" program control system, that is a control system in which the address of a particular division is specified by the number of divisions between a fixed reference point and the specified division. For example, if the storage element is a magnetic drum, the fixed reference point is a point on the drum at which the cycle of operation of the drum begins. On the other hand, if the storage element is a circulating memory, such as an acoustic delay line, the fixed reference point is a reference point in the recirculation cycle of the line.

A fixed reference program control system requires three major components, namely, a register, a counter, and a coincidence circuit. The register is utilized to store the address of the particular division desired, while the counter counts the number of divisions of the storage element passing the transducing element. The counter generally is initially set at zero and starts counting when the reference point passes the transducing element. The coincidence device continuously compares the number in the register with the number in the counter. When coincidence occurs, the desired division is available at the transducing element, and the coincidence circuit generates a gating signal which permits the transducing element to write a word into or read a word out of the storage element.

The tube requirement for a fixed reference control system is at least one tube per stage of the register, at least one tube per stage of the counter, and a half tube, or matrix equivalents, per stage of the coincidence device. Where the system is designed to operate at digit pulse rates in excess of several hundred kilocycles per second, additional tubes are required for each stage of the register and the counter.

In addition, since the counter must be capable of counting the total number of divisions in the storage element, the number of digits of an order word which must be allotted to specifying the address of a division is equal to the number of digits in the binary number equivalent or coded decimal equivalent of the total number of divisions. For example, in a 32 word memory device of a binary digital computer, five digits of the order word would be allotted to specifying the address of a division. Therefore, for any given word length, the number of digits available for other purposes, such as specifying the operation on the number, is limited to five less than the total number of digits, in the chosen example.

Furthermore, since all divisions are referenced to a fixed point in the storage element, the problem of coding or programming a routine becomes relatively difficult. This difficulty resides in the fact that the coder must reference all words to a fixed point, usually the origin, irrespective of where a single operation of the routine is completed. For the same reason, the coder generally encounters difficulty in efficiently utilizing the available space in the storage element. Finally, due to referencing all words to a fixed point, it is relatively difficult for the coder to check a program in order to determine the accuracy of the coding.

The present invention discloses a new and novel automatic program control system which obviates the above and other disadvantages of the prior art. The basic principle of the present invention is the designation of a particular division in the storage element relative to a point in the previous operation, such as the point in the storage element available at the transducing element when the previous operation is completed. Since the reference point in the control system of this invention will vary during a routine, such a reference point is termed a "floating" reference, rather than a fixed reference, as in the prior art system. The control system, therefore, may be considered as a relative address system, as distinguished from the fixed reference address system of the prior art.

More particularly, in the present invention, a single register is utilized to specify each address with respect to the previously known point in the storage element at which the previous operation was completed. This address is set into the register which is designed to count as well as store numbers. Upon completion of the previous operation, the register starts counting divisions until the desired division is available at the transducing element. At this instant, the register generates a gating signal for permitting transfer to or from the storage element.

Since this control system requires only a single counter-register and no coincidence devices, a considerable reduction in the number of required tubes is attained by the present invention. In addition, since all addresses are referred to a point in the previous operation, it is not necessary to allot to the address portion of the order word a number of digits equal to the number of digits of the binary number equivalent of the total number of divisions in the storage element. Furthermore, since all addresses are referenced to a point in the previous operation, the problem of coding and of checking the code is simplified. Finally, it has been found that the relative address system of the present invention permits greater packing of words in the memory device, that is more efficient utilization of the available space in the storage element.

Accordingly, it is an object of the invention to provide an automatic program control system for a digital computer, the system employing a floating reference for specifying the address of a word.

Another object is to provide a relative address system for specifying the address of a division in the storage element of a digital computer.

A further object of the invention is to provide a relative address system for a digital computer in which the address of each word is referenced to a point in the previous operation.

Still another object is to provide a relative address system for a digital computer in which the address of each word is specified with respect to the point of completion of the previous operation.

An additional object is to provide a relative address system for a digital computer, the system employing a single counter-register for storing the address and for counting the number of divisions until the desired division in the storage element is available.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 is a block diagram of one embodiment of the automatic program control system of the present invention;

Fig. 2 is a composite diagram of the waveforms of signals appearing at various points in the circuit of Fig. 1;

Fig. 3 is a schematic diagram of one form of the turn-on device of Fig. 1;

Fig. 4 is a schematic diagram of one form of shifting-and-counting register for use in the circuit of Fig. 1; and Fig. 5 is a block diagram of a modified portion of the circuit of Fig. 1 in which parallel transfer of a portion of the word is utilized.

Reference is now made to Fig. 1 wherein there is shown a block diagram of one form of the automatic program control system of the present invention, the system being shown in its association with various elements of a serial-type digital computer to be controlled. As indicated in Fig. 1 the system comprises a storing and counting register, generally designated 11, for receiving instruction words from a memory device 13, the words being entered serially into register 11 through a gate 14 and being shifted from left to right through register 11.

Each word available in memory 13 includes four sections respectively providing information concerning: (1) the operation to be performed; (2) the band or track of the next order in memory 13; (3) the number of memory divisions between the end of the next order division and a number to be transferred or operated upon; and (4) the number of divisions following the end of an operation before the next order or word of instruction is available. Sections (1), (2), (3), and (4) of each word are entered respectively into an operation section 15, a band section 16, a count-to-number section 17, and a count-to-order section 18 of register 11 through gate 14 at the beginning of each search for information in memory 13.

While the various sections of the words in memory 13 may have any number of digits, in any desired code, it will be assumed for the purpose of illustration that word sections (1), (2), (3), and (4) include 4, 4, 5, and 4 binary digits, respectively, arranged in a conventional binary code. It will be understood that the number of digits is arbitrarily selected since each selection depends upon the number of operations which may be performed, the number of bands or tracks in memory 13, and the number of divisions in memory 13. A five binary digit operation code, for example, allows a selection of 32 operations.

In an illustrative word, for example, the binary number (1)  (2)  (3)  (4)
0011/0101/00001/0110 might be available. This word is shifted serially into register 11, starting with the least significant digit in section (4), until the 4 binary digits of section (4) have been entered into 4 storage elements in section 18 of register 11; the 5 binary digits of section (3) of the word have been entered into 5 storage elements in section 17 of register 11; and so forth.

The particular operation to be performed is indicated by an operation decoder circuit 12 which receives the coded signals produced by register section 15 and produces an output signal which is applied to an arithmetic unit 21, the output signal representing the corresponding operation. The connection between decoder 12 and element 21 is represented by dashed line 22. When the operation is a number transfer decoder 12 produces a signal indicating the band location of the number in addition to the fact that a transfer is specified in the operation code. During transfer operations, the output signal of decoder 12 is applied to memory device 13, the operative connection between device 13 and decoder 12 being shown as a dashed line 23.

Decoder 12, however, does not become operative until a signal is received from a gating circuit 19 indicating that the number to be operated upon or transferred has been located. It may be noted at this point that transfer operations or memory word locating operations as well as arithmetic operations are considered to be computing operations as utilized in the claims which follow.

Since the band or track location of a word to be entered into register 11 must be retained during the time the word is being shifted through register section 16, which originally held this information, it is apparent that the information in register 16 must be transferred to a static storage register after its initial serial entry. Thus, an additional band control register and matrix 24 is provided, information in register section 16 being transferred to register 24 through a gate 25 at the completion of the reading of a word. The matrix portion of register 24 produces a band control signal which indicates the band in memory device 13 which is to be read or to be recorded upon, the connection between register 24 and memory device 13 being indicated by dashed line 20.

After words have been entered into register 11 count-to-number register 17 is actuated to count the number of divisions in memory device 13 between the location of the word which has just been entered and the number to be operated upon or transferred. The division intervals in memory 13 are indicated by timing signals SP produced by a source of timing pulses 26, one signal SP being produced at the beginning of each word division. Source 26 also produces an origin pulse OP indicating a beginning reference point in memory 13 and timing pulses TP indicating the digit positions in each digit of a word.

Word or division indicating signals SP are applied to count-to-number section 17 through a gate 27 under the control of a count-to-control device 28 which produces a 1-representing or high-level output signal when the operation or order to be performed has been located and entered into register 11. Thus, counting is initiated in register section 17 after the word or instruction has been located and has been serially shifted into register 11, and it is then necessary to locate the number to be operated upon.

Each new word or order location is referenced to the end of a preceding operation as indicated by a signal produced by arithmetic element 21. This signal is utilized to set a count-to-order control device 33 to a 1-representing state allowing the passage of signals SP through a gate 32 to initiate the counting operation of section 18. Since signals SP are produced between digit timing pulse TP between words, in a manner to be considered in further detail later control device 33 is set to 1 after an operation in time to allow the passage of a signal SP through gate 32 to count-to-order register 18 before the availability of the next division. Thus, if the division of the next order immediately follows the end of the division during which the operation is completed, a code indicating a count to order of zero is entered into register 18 and the next signal SP actuates register 18 to produce an order-coincidence signal in a manner to be described.

After an order has been located control device 33 is set to 0 by means of the order-coincidence signal applied to a 0-setting input circuit. In a similar manner control device 28 is set to 0 by means of a number-coincidence signal applied through a lead 31 connected to a 0-setting input circuit of device 28.

In order to begin any computing operation count-to-order device 33 must be set to 1 and an initial word or order must be entered into register 11. This is accomplished by means of a turn-on device 34 which produces a preset signal applied to a 1-setting input circuit of count-to-order control device 33 for actuating device 33 to initiate the count-to-order operation. After the first or any order has been located, register section 18 produces an order coincidence signal which is applied to a 1-setting input circuit of a read and shift control device 35. Device 35 then produces a 1-representing or high-level control signal which is utilized to actuate gate 14 to initiate the shifting in of the word which has been located, the shifting being synchronized by timing pulses TP which are applied through gate 14 to each storage element in register 11. Device 35 must be reset to 0 in order to terminate the word read-in operation through gate 14, at the end of the division during which the word is read. This is accomplished through a gate 29 which receives signals SP and a control signal from control device 35 indicating that an order is being read into register 11. A signal SP passes through gate 29 to set device 35 to 0, therefore, at the end of the corresponding division.

Many of the circuits shown in Fig. 1 are now so well known in the computing art that it is not considered necessary to describe these circuits in detail in this application. Memory device 13, for example, is a conventional serial memory which includes a cyclically operable storage element divided into a plurality of divisions for storing a plurality of words respectively, and includes transducing means for writing words into and reading words out of the storage element. A magnetic memory device of this type is shown in U. S. Patent No. 2,609,143 entitled "Electronic Computer for Addition and Subtraction" by G. R. Stibitz, issued September 2, 1952.

In Fig. 1 of the Stibitz patent the cyclically operable storage elements are disks such as, for example, disk 28 which stores magnetic information which is utilized for addition operations. The information on each disk is translated by means of appropriate amplification stages which constitute the transducing means referred to in the present application. Thus, amplifier 39 and push-pull inverter stage 42 of Fig. 1 in the patent provide output signals which may be applied to gate 14 in the present invention and shifted, in response to timing pulses TP, into register 11.

The Stibitz patent, it will be noted, also discloses a timing pulse source which is suitable for source 26 associated with the present invention. The signals are derived from a disk 150 which is connected to a common shaft with the memory disks. A pulse generator circuit 155 in the patent provides the desired pulse output signals which are suitable as signals TP.

Operation decoder 12 and the matrix associated with band control register 24 are not considered in detail since these circuits may be conventional matrices such as those described in Fig. 4–3a on page 42 of "High-Speed Computing Devices" by the staff of Engineering Research Associates, Inc., published in 1950 by McGraw-Hill Book Company, Inc. Since control devices 28, 33, and 35 are essentially bistable devices, a conventional flip-flop or multivibrator circuit may be utilized. A flip-flop suitable for this purpose is illustrated in Fig. 4 of the drawings in circuit 51 which will be described in further detail below. It will be understood, however, that many other types of bistable devices are suitable. It is not considered necessary to describe the operation of such a flip-flop circuit in detail since this description is readily found in references related to the computing art such as in the description found on page 111 and in Fig. 1B of an article entitled "Digital Computer Switching Circuits" by C. H. Page, published in Electronics, September 1948. In this article the inputs to the grids designated as "Set 1" and "Set 0" are fully analogous to the "1" and "0" inputs of bistables shown in applicant's invention. The "1" output signal may be obtained from a connection to the right hand anode of the twin triode used in the multivibrator described by Page.

Gates 14, 19, 25, 27, 29, and 32 are also well known in the computing art being frequently referred to as "and" gates. Such gates require a coincidence of the "on" or high-level condition of all control signals to produce an output signal. Thus, gate 14 produces an output signal representing a digit of a word in memory 13 only when there is a coincidence of signal TP, and an "on" or 1-representing control signal from device 35. As pointed out above, however, gate 14 also functions to apply timing pulse signals to each storage element in register 11 during shifting operations.

Gate circuits suitable for use in the invention are described on pages 37 to 45 of "High-Speed Computing Devices" by Engineering Research Associates, published in 1950 by McGraw-Hill Book Company, Inc., New York and London, and on pages 511 through 514 of an article entitled "Diode Coincidence and Mixing Circuits in Digital Computers" by Tung Chang Chen, in the Proceedings of the Institute of Radio Engineers, volume 38, May 1950. It is not considered necessary to specifically indicate the manner in which each gate is utilized since this utilization is now well known in the computing art.

Although register 11 and turn-on device 34 may assume various forms, the forms being similar to known devices in the prior art, it is helpful in furthering the understanding of the invention to describe these devices in detail in this application; register 11 and device 34 being illustrated in Figs. 3 and 4, respectively. Fig. 4, it will be noted specifically illustrates the count-to-order register section 18 and includes both counting and shifting structure. The shifting circuits shown are suitable for register sections 15 and 16 as well and count-to-number register 17 may be identical to register 18 except that its coincidence output signal indicates that a number has been located rather than an order. In other words register 11 is a single shifting register with counting circuits added in sections 17 and 18. Finally, band control register 24 may comprise a register similar to the register shown in Fig. 4, no counting circuits being required, or may be adapted to receive signals shifted in parallel, a method of parallel transfer being described in Fig. 5, with respect to register section 15.

In operation, with turn-on device 34 unactuated, gate 19 remains closed, and no operation signals can be applied from decoder 12 to either element 21 or memory device 13. After device 34 is turned on, the next origin pulse OP, which occurs between the last division and the first division of the storage element of the memory device, as shown in Fig. 2, is applied to register 24 to set register 24 to zero thereby actuating operative connection 20 to apply the signal in the zero band of memory device 13 to the input terminal of gate 14, and to gate 19 to open gate 19. Origin pulse OP also is applied to register 18 to set register 18 to a predetermined count.

The preset count in register 18 may have numerous values, depending upon the type of counting employed and the preference of the programmer or coder. Thus, if register 18 counts up, the preset count is some value less than the maximum count of register 18, while if register 18 counts down, the count may be preset to zero or a value greater than zero. In one particular count-down embodiment of register 18, as shown in Fig. 4, the count of register 18 has been preset to one, with order coincidence ocurring upon application to register 18 of the first pulse after the count reads zero.

In order to permit registers 18 and 24 to reach stabilization before register 18 begins to count, it is preferable that the pulses to be counted be delayed with respect to pulse OP. This arrangement is illustrated in Fig. 2, wherein pulse SP occurs after pulse OP, although it does occur during the interval between the last digit pulse of the last word and the first digit pulse of the first word. It is to be understood, of course, that although the pulses are shown as being negative, they may be positive as well.

In the above-described embodiment of register 18 in which register 18 counts down and has been preset to one, the first count pulse applied to register 18 is the first SP pulse shown in Fig. 2, this pulse occurring just prior to the first digit pulse of the first word, as shown in Fig. 2. In respond to this first SP pulse, register 18 counts down from one to zero. The second SP pulse is then applied to register 18 and register 18 counts down to −1 which indicates order coincidence, that is indicates that the desired order is about to be read from memory device 13. Accordingly, it is merely necessary for a human coder to position the first order in the second division of the storage element of memory device 13. On the other hand, if the coder desires to place the first order in the first division of memory device 13, register 18 either may be preset at zero, or may be arranged to indicate order coincidence at zero count.

The order coincidence pulse, indicated in the fourth line of Fig. 2, is applied to control device 33 to remove the output signal from device 33 and close gate 32. The order coincidence pulse also is applied to one input terminal of control device 35 to produce a signal at the output terminal of device 35, as shown in the fifth line of Fig. 2. The signal at the output terminal of device 35 opens gate 29 and gate 14, the latter gate permitting the order from the zero band of memory device 13 to be shifted into register 11.

At the end of the second division, the complete order is in register 11, and the third SP pulse is applied to device 35 through gate 29 to remove the signal at the output terminal of device 35. The third SP pulse also is applied through gate 29 to gate 25 to cause the parallel transfer from band register 16 to band control register 24. Although several types of parallel transfer may be utilized, it is preferred that gate 25 transfer both 1's and 0's from register 16 to register 24, so that it is not necessary to reset register 24 each time a parallel transfer is to be made. The information thus placed in register 24 is the band of both the next number and the next order.

The third SP pulse also is applied through gate 29 to the 1 input terminal of device 28 which produces a signal at its 1 output terminal, as indicated in the sixth line of Fig. 2. The output signal from device 28 opens gate 27 to permit the succeeding SP pulses to be counted in count-to-number register 17. Instead of counting down from 1, register 17 counts down from the number specified in the order, that is from the number represented by the five digits of the order in register 17. Register 17 continues to count the SP pulses until number coincidence occurs, that is until register 17 counts down to −1.

Upon number coincidence, a pulse is applied from register 17 to the 0 input terminal of device 28 to remove the output signal from device 28 and close gate 27. This pulse also is applied through gate 19 to decoder 12 to actuate decoder 12 and apply an operation pulse, through an operative connection indicated by dashed line 22, to element 21 and a read or write signal, through an operative connection indicated by dashed line 23, to device 13. Since register 24 specified the band of the number in device 13, the complete operation is specified and may proceed.

At the end of the operation, a pulse is applied from element 21 to the 1 input terminal of control device 33, and a signal appears at the 1 output terminal of device 33. Gate 32 is opened and register 18 again begins to count down to order coincidence. However, instead of counting down from 1, register 18 now counts down from the number specified in the order in the register. One cycle of operation is, therefore, completed.

It is thus seen that the automatic program control system of Fig. 1 employs a floating reference point for all control operations, except the initial count-to-order operation. In other words, the address of any other order is related to the end of the previous operation by element 21, while the address of a number is related to the end of the count-to-order operation. Since each of the floating references is known to the coder, it is merely necessary for the coder to count from this point to determine where to place all other words and how to program a routine.

As shown in Fig. 1, the system according to this invention requires only a single counter-register 11 and no coincidence devices. Accordingly, the system requires considerably less tubes than the fixed reference systems of the prior art. Furthermore, since the address of any given order is specified with respect to the end of operation point of the previous operation, the order may be placed as near to this point as desired. In this manner, it is unnecessary to make the maximum count of register 18 equal to the total number of words that may be stored in one band of memory device, as in prior art control systems. For example, it has been found, in the practice of this invention, that a four-place register is capable of controlling a 32-word memory device.

Since all addresses are referenced to a point in the previous operation, it is relatively simple to check the coding of any routine. In addition, it has been found, in practice, that the present invention simplifies coding of a routine, and permits more efficient utilization of the available space in the memory device.

Referring now to Fig. 3, there is shown one embodiment of turn-on device 34 of Fig. 1. Device 34 of Fig. 3 comprises a flip-flop circuit 36 having one input terminal designated 1, connected to source 26 to receive the OP pulse. The 1 output terminal of circuit 36 is connected through any conventional differentiating circuit 37 to one input terminal, designated 1, of another flip-flop circuit 38. The output signal from differentiating circuit 37 constitutes the preset signal of Fig. 1, and is applied to register 18, control device 33 and register 24. The 1 output terminal of flip-flop circuit 38 is connected to the control terminal of gate 19 of Fig. 1.

Circuit 36 has another input terminal, designated 0, connected through a resistor 39 to one plate of capacitor 41, the other plate of capacitor 41 being grounded. The plate of capacitor 41 which is connected to resistor 39 is also connected to the negative or −C terminal of a source of direct-current potential, not shown, through a resistor 42, a normally-closed start switch 43 and a normally-closed relay 44. Similarly, circuit 38 has another input terminal, designated 0, connected to one plate of a capacitor 45 through a resistor 46, and to the −C terminal through a resistor 47. The −C terminal also is connected to resistors 42 and 47 through a normally-open stop switch 48.

In operation, with switch 43 and relay 44 closed, the −C terminal is connected to the 0 input terminal of each of flip-flop circuits 36 and 38. The magnitude of the direct-current potential is such as to prevent triggering or tuning over of either of circuits 36 and 38, even in the presence f an OP pulse. Accordingly, no signal appears on the output terminal of either of circuits 36 and 38.

When the machine is started, switch 43 is opened, and both 0 input terminals are released from the —C terminal, and the negative potential at the 0 input terminal of circuit 5 drops owing to the current discharge through resistor 9 and capacitor 41. Similarly, the potential at the 0 put terminal of circuit 38 discharges through capacitor 5 and resistor 46. In order to assure that circuit 36 does not trigger before circuit 38 is ready to trigger, the me constant of resistor 39 and capacitor 41 is made larger than that of resistor 46 and capacitor 45.

The first OP pulse, after switch 43 is opened, triggers circuit 36 and produces an output signal at the 1 output terminal of circuit 36. The output signal is differentiated by circuit 37 and the differentiated signal constitutes the reset pulse, one pulse being formed for each change of state of circuit 36. The differentiated signal also is applied to the 1 input terminal of circuit 38 to trigger circuit 38 and open gate 19. Triggering of circuit 38 also actuates relay 44 and maintains the release of the —C terminal from circuits 36 and 38.

Under these conditions, an unchanging output signal appears continuously at circuit 36, and no further differentiated pulses appear at the output end of differentiating circuit 37. Circuit 38 remains in the same condition, since no other triggering pulses are applied to the 1 input terminal thereof. Accordingly, gate 19 remains open throughout the entire operation.

When it is desired to stop the machine, stop switch 48 is closed, and the —C terminal is connected to the 0 input terminal of each of flip-flop circuits 36 and 38. Under these conditions, circuit 38 is triggered, and the output signal is removed from gate 19. Accordingly, no operation pulses will reach element 21, and the machine cannot perform any further operations. This completes the cycle of operation of turn-on device 34.

Referring now to Fig. 4, there is shown one form of shifting-and-counting register which may be used in the circuit of Fig. 1. More particularly, Fig. 4 shows one embodiment of count-to-order register 18, together with its input and output connections. It is to be understood, of course, that the count-down register of Fig. 4 is merely illustrative of the type of register which may be used in the present invention, and is not intended as a limitation on the scope of the invention, as defined in the appending claims.

In Fig. 4, register 18 comprises four double-trigger flip-flop circuits 51, 52, 53, and 54. Since all of the circuits are identical, only circuit 51 is shown in detail, circuits 52, 53 and 54 being shown in block form with their input and output connections. As shown, circuit 1 includes a twin triode 55 having the plate of its left-hand or A section coupled to the grid of its right-hand or B section through a parallel RC circuit, designated generally as 56. The plate of the B section of triode 55 is coupled through a similar RC circuit 57 to the grid of the A section. The grids of triode 55 are connected to the —C terminal of a source of direct-current potential, not shown, through a pair of resistors, respectively, the other terminal of the source being connected to ground. The cathodes of triode 55 are connected to ground, while the plate of the B section is connected through a resistor, not designated, to the +B terminal of a source of direct-current potential, not shown, the other terminal of this source being grounded.

The plate of the A section of triode 55 is connected to the +B terminal through a resistor, not designated, and a peaker circuit including a peaking coil 58 and a diode 59. The purpose of the peaker circuit is to produce a sharp negative pulse on lead 60 whenever the A section of triode 55 goes from a nonconducting state to a conducting state. Thus, when the A section is triggered, the potential at the plate of the A section changes from a relatively high value to a relatively low value. This change in potential results in a ringing or damped oscillating signal across coil 58, the first peak of this signal being negative. By arranging diode 59 with the polarity indicated in Fig. 4, all other portions of the signal are substantially shorted out, and a negative pulse is produced at lead 60. On the other hand, when the A section goes from a conducting state to a nonconducting state, the rise in potential at the plate of the A section is shorted out by diode 59, and no pulse appears at lead 60. The manner in which the negative pulse is utilized in counting is explained more fully below.

This completes the description of the internal connections of circuit 51. As stated above, the internal connections of each of circuits 52, 53 and 54 are identical with those of circuit 51. Accordingly, in Fig. 4, circuits 52, 53 and 54 are shown in block form, with the plate terminals of the A and B sections of each circuit being designated $P_A$ and $P_B$, respectively, and the grid terminals being designated $G_A$ and $G_B$. The connection to the peaking coil of each circuit is shown at the top of each block in Fig. 4.

The external connections for circuit 51 include a pair of resistors 61 and 62 serially connected between the plate of the B section and the —C terminal, and a pair of resistors 63 and 64 serially connected between the plate of the A section and the —C terminal. Each pair of resistors constitutes a voltage divider between the plate and the —C terminal, the common junction of resistors 61 and 62 being connected to the grid of the A section of circuit 52 through a diode 65, while a diode 66 connects the grid of the B section of circuit 52 to the common junction of resistors 63 and 64. As shown in Fig. 4, similar voltage divider connections are provided between circuits 52 and 53 and between circuits 53 and 54. No voltage divider connections are provided in the plates of circuit 54, since, as set forth more fully below, no shifting is performed out of circuit 54. The grids of the A and B sections of triode 55 are connected, respectively, through diodes 67 and 68 to the voltage dividers of the last stage of count-to-number register 17 which is not shown in Fig. 4.

The cathodes of diodes 67 and 68 are connected to a timing signal bus 69 through capacitors 71 and 72, respectively. Similar capacitive connections are provided between bus 69 and the diodes of each of circuits 52, 53 and 54. The signals applied to bus 69 are the TP timing pulses from source 26, these pulses being shown in Fig. 1 as applied to gate 14. As shown in the last line of Fig. 2, the number of timing or TP pulses per word interval is equal to the number of digit pulses per word interval, each TP pulse being delayed slightly with respect to the corresponding digit pulse. Under the control of control device 35, the TP pulses are utilized in shifting words from memory device 13 into register 11, as set forth below.

The grids of the A and B sections of triode 55 are connected to the common junction of a pair of serially-connected resistors 73 and 74 through diodes 75 and 76, respectively. Resistors 73 and 74 are connected between the +B terminal and ground and maintain the potential at the common junction at a relatively low positive value, such as five volts. In this manner, any noise signals, that is signals of five volts magnitude or less, will be unable to reach the grids, due to diodes 75 and 76, and to inadvertently trigger triode 55. Similar connections are provided for each of circuits 52, 53 and 54.

The common junction of resistors 73 and 74 is coupled through a capacitor 77 to the peaking circuit of circuit 52, similar capacitive coupling being provided between circuits 52 and 53 and circuits 53 and 54. In this manner, negative pulses produced at the peaking circuit of any stage of register 18 will be coupled to both grids of the next preceding stage. A clamping circuit is provided in order to prevent coupling of these negative pulses during the shifting operation of register 18. The clamping circuit includes a resistor 78 having one end connected to the output terminal of control device 33, the other end of resistor 78 being connected to the common junction 82 of a series circuit including a resistor 79 and a diode 81. The cathode of diode 81 is connected to the +B terminal, while the free end of resistor 79 is connected to the +BB terminal of another source of direct-current potential, not shown, having its other terminal grounded. Junction 82 is connected through a diode 83 to lead 60 and the peaking circuit including diode 59 and coil 58. Similar diodes, not designated, interconnect circuits 52, 53 and 54 with junction 82.

If it is assumed that the voltage at the +BB terminal is higher than at the +B terminal, then, when control device 33 is unactuated, junction 82 will be maintained at substantially the voltage at the +B terminal. Stated differently, with the potential at the 1 output terminal of device 33 at a relatively high voltage, diode 81 will clamp the voltage at junction 82 to that at the +B terminal. Accordingly, under these conditions, the anode of diode 83 will be at the same voltage as the cathode, and any negative pulses at coil 58 will be squelched. On the other hand, with device 33 actuated, the voltage at the 1 output terminal will drop, and the voltage at junction 82 will fall below the voltage at the +B terminal. If the fall in voltage at junction 82 exceeds the amplitude of the negative pulses from the peaking circuits, then any negative pulses from the peaking circuits of circuits 52, 53, and 54 respectively, will be passed and will be applied to the grids of circuits 51, 52, and 53 respectively. The pulse from the peaking circuit of circuit 51 will be applied through lead 60 and a capacitor 84 as the order coincidence pulse.

The preset pulse from turn-on device 34 is applied through a capacitor 85 to a preset signal bus 86. The grid of the A section of triode 55 is connected to bus 86 through a diode 87. Similar diodes, not designated, connect the grids of the A section of circuits 52 and 53 to bus 86. On the other hand, the grid of the B section of circuit 54 is connected to bus 86 through a diode 88, while the grid of the A section of circuit 54 is not connected to bus 86. A voltage divider, including resistors 89 and 91, is connected between the +B terminal and ground, the common junction of resistors 89 and 91 being connected to bus 86. This voltage-divider functions in the same manner as the above-described voltage-divider including resistors 73 and 74 to prevent noise signals from turn-on device 34, or from bus 86, from inadvertently triggering any of circuits 51, 52, 53 and 54.

In operation, assuming any arbitrary states for circuits 51 through 54, actuation of start switch 43 of turn-on device 34 produces a negative pulse at the output terminal of circuit 37 of device 34. This pulse is applied through capacitor 85 to bus 86, and through diode 87 to the grid of the A section of triode 55. The pulse also is applied to the grid of the A section of each of circuits 52 and 53, and to the grid of the B section of circuit 54. Accordingly, irrespective of the previous conditions of circuits 51 through 54, the effect of the preset pulse will be to render conducting each of the B sections of circuits 51, 52 and 53 and the A section of circuit 54. Accordingly, the plate of the B section of each of circuits 51, 52 and 53 will be at a relatively low voltage level, indicating the binary number 0, while the plate of the B section of circuit 54 will be at a relatively high voltage level, indicating the binary number 1. Therefore, the preset pulse will set count-to-order register 18 to 0001, as set forth above.

The preset pulse also is applied to the 1 input terminal of count-to-order control device 33, and device 33 is actuated. Actuation of device 33 opens gate 32 to apply the SP pulses to circuit 54 through a capacitor 92, and lowers the voltage at junction 82. The first SP pulse is applied to the grids of circuit 54 and triggers circuit 54, rendering the B section conducting and the A section nonconducting. Since the plate of the A section swings from a relatively low positive value to a relatively high positive value, no pulse is applied from the peaker of circuit 54 to the grids of circuit 53. Accordingly, no further action results from the first SP pulse, and register 18 indicates the binary number 0000.

Although the time pulses and digit pulses of the first word occur prior to the second SP pulse, gate 14 remains closed and register 18 is unaltered. When the second SP pulse arrives, circuit 54 is triggered and the B section is cut off while the A section conducts. Since the plate of the A section now swings from a relatively high voltage level to a relatively low voltage level, the peaker of circuit 54 generates a negative pulse. With junction 82 at a voltage level less than at the +B terminal, the negative pulse is applied to the grids of circuit 53 and triggers circuit 53. Accordingly, the A section of circuit 53 switches from a nonconducting state to a conducting state, and a triggering pulse is applied from the peaker of circuit 53 to the grids of circuit 52. Similarly, circuit 52 triggers and, in turn, triggers circuit 51. Triggering of circuit 51 produces the order coincidence pulse which is applied through lead 60 and capacitor 84 to control device 33 and control device 35. In effect, therefore, order coincidence occurs when register 18 counts down to −1.

When control device 35 is actuated, gate 14 is opened and the digits of the order word in memory device 13 are shifted into register 11. No further counting occurs in register 18, since gate 32 was closed by the order coincidence pulse. In addition, junction 82 of register 18 was returned to its high voltage level by the order coincidence pulse, and any negative pulses generated by the peaker of circuit 51 are squelched by the clamping circuit. Accordingly, no order coincidence pulse will be obtained during the shifting operation.

As stated above, shifting in register 11 occurs from left to right, as viewed in Fig. 1. Accordingly, the first digit pulse read from memory device 13 will not reach circuit 51 until it has been shifted through each of registers 15, 16 and 17. During the shifting operation in these registers, the A section of each of the circuits of register 18 is conducting, and the B section is cut off. Under these conditions, the grid of each A section is at a relatively high voltage level, such as slightly above 0 volt, while the grid of each B section is at a relatively low voltage level, such as −20 volts. In addition, each voltage divider, such as resistors 63 and 64, is so arranged that when the associated section is conducting the voltage applied to the grid of the next succeeding circuit is at a relatively low level, such as +5 volts, while when the associated section is nonconducting a relatively high level voltage, such as +35 volts, is applied to the grid of the next circuit. Finally, it is assumed that the amplitude of the TP pulses is of the order of 15 volts.

Consider now the effect of application of a TP pulse to the grids of circuit 52. With the A section conducting, grid $G_A$ of circuit 52 is at slightly above 0 volt, while grid $G_B$ is at −20 volts. With the A section of circuit 51 conducting, the voltage applied to the cathode of diode 65 is +35 volts, while the voltage applied to the cathode of diode 66 is +5 volts. Accordingly, the 15 volt TP pulse will drive the voltage at the cathode of diode 65 to +20 volts, and, with the anode of diode 65 at slightly above 0 volt, the diode will not conduct and the TP pulse will not reach the grid of the A section of circuit 52. Similarly, the TP pulse will drive the voltage at the cathode of diode 66 to −10 volts, but with the anode of diode 66 at −20 volts, the TP pulse will not reach the grid of the B section of circuit 52. Accordingly, the TP pulse will not trigger circuit 52, and the A section will remain conducting. It is thus seen that, with the A section of a circuit of register 18 conducting and the A section of the immediately preceding circuit conducting, the TP pulse will be ineffective. In other words, with a binary digit 1 in each circuit, no shifting occurs.

On the other hand, with the A section of circuit 52 conducting and the B section of circuit 51 conducting, the voltage at the anode of each of diodes 65 and 66 will be the same, while the voltages at the cathodes will be reversed. Under these conditions, the TP pulse will drive the voltage at the cathode of diode 65 below the anode voltage, and diode 65 will conduct the TP pulse to the grid of the A section of circuit 52. Accordingly, circuit 52 will be triggered, and the B section rendered conducting while the A section is cut off. In other words, the binary digit 0 in circuit 51 will be shifted to circuit 52.

From the symmetry of circuits 51 and 52, it is apparent that shifting will occur when the B section of circuit 52 is conducting and the A section of circuit 51 is conducting at the time of arrival of the TP pulse. On the other hand, the TP pulse will not produce a shift if both B sections are conducting. It is thus seen that the configuration of circuits 51 and 52 is such as to permit shifting toward the right, as viewed in Fig. 4, under the control of the TP pulses. It is to be understood, of course, that the particular voltage values described are merely illustrative, and that other values may be utilized without departing from the spirit and scope of this invention.

Although the shifting operation has been described in connection with circuits 51 and 52, it should be apparent that shifting occurs simultaneously in all of the circuits of register 11. This results from the fact that the TP pulse is applied simultaneously to each of the stages of register 11, the shifting operation being determined by the levels of the voltages applied to the diode of each section. Thus, at the end of the shifting operation, the complete order is shifted into register 11, the first digit of the order being found in circuit 54 of register 18.

After the completion of the shifting operation, the next SP pulse is applied through gate 29 to the 0 input terminal of device 35, thereby closing gate 14 and preventing any further shifting. The SP pulse also is applied to count-to-number control device 28 to open gate 27 and start the count-to-number operation. Counting in count-to-number register 17 occurs in precisely the same manner as that in register 18, and no detailed description thereof is given.

Although the invention has been described in connection with a computer which reads in words serially from a memory device to a register, that it reads by shifting, it should be apparent that this invention is equally applicable to computers in which the word is transferred in parallel, that is all the digits of the word are read simultaneously. One illustration of parallel transfer has been set forth previously in connection with band register 16 and gate 25. In the description of this transfer, it was stated that the system could transfer either both zeros and ones, or only ones if register 24 were preset initially to zero. In the case of register 18 in which all of the stages are set to one by the count-to-order operation, it should be apparent that the transfer mechanism need only transfer zeros.

Referring now to Fig. 5, there is shown one parallel transfer arrangement for the operation register. In Fig. 5, the operation register is designated generally as 115 and comprises a plurality of flip-flop circuits 151, 152, 153 and 154. The grid of the A section of circuit 151 is connected to a bus 101 through a diode 102, bus 101 receiving the order coincidence pulse from count-to-order register 18. Similar diode connections, not designated, are provided between bus 101 and the grid of the A section of each of circuits 152, 153 and 154.

Bus 101 also is connected to the 1 input terminal of a read control device 135, corresponding to device 35 of Fig. 1, the 0 input terminal of device 135 receiving the SP pulses. The output terminal of device 135 is connected to the control terminal of each of a plurality of gates 103, 104, 105, 106 corresponding to circuits 151 through 154, respectively. The input terminal of each of gates 103 through 106 is connected to a memory device 113 in which the four digits representing the operation appear simultaneously. In the case of a magnetic drum memory device, each digit would appear on a separate band of the drum. The output terminal of each of gates 103 through 106 is connected to the grid of the B section of its associated flip-flop circuit.

In operation, the order coincidence pulse, which occurs just after an SP pulse, is applied by means of bus 101 to the grid of the A section of each of circuits 151 through 154. If any of circuits 151 through 154 had its A section conducting, the order coincidence pulse would trigger this circuit and cut off the A section. In other words, the order coincidence pulse serves to render all of the B sections conducting, that is sets register 115 to zero.

The order coincidence pulse also actuates control device 135 which opens gates 103 through 106. Accordingly, if a 1 signal appears in the band of memory device 113, this signal is applied to the grid of the B section of the associated flip-flop circuit. The next SP pulse is applied to the 0 input terminal of control device 135 and closes gates 103 through 106. The computer is then ready to count to number in register 17.

It should be noted that, since all of the digit signals of a word are transferred simultaneously, the transfer or reading process consumes only one digit time interval, as distinguished from the word time interval required for serial transfer. Accordingly, the SP pulses may be separated by one digit time intervals in the parallel machine. Thus, in a parallel machine, a division or a word has a duration of only one digit time interval. In addition, no timing or TP pulses are required in a parallel machine, since, as described above, the order coincidence pulse performs the required timing operation.

What is claimed as new is:

1. In combination, a memory member for storing a plurality of bits of signal information subdivided into words and word sections, a register for receiving the bits of signal information from the memory member, gating means for controlling the passage of the bits of signal information from the memory member to the register, means in the register for decoding the bits of information passing to the register to produce an opening of the gating means for the passage of a particular word of signal information from the memory member to the register, and means associated with the register for closing the gating means to the passage of signal information from the memory means to the register after the introduction to the register of the signal information representing the particular word.

2. In combination, a memory member for storing a plurality of bits of signal information subdivided into words and word sections and for sequentially presenting the bits of information for use, a register for receiving from the memory member word sections at selected times, a gate for controlling the passage of the bits of signal information from the memory member into the register, means in the register for operating upon particular word sections passing into the register to provide a control signal upon the presentation for use in the memory member of a number of word sections dependent upon the information in the particular word sections, means associated with the gate for opening the gate for the passage to the register from the memory member of a plurality of bits representing a word upon the occurrence of the control signal, and means associated with the last mentioned means for closing the gate against any further passage of information to the register upon the passage to the register of the signal information representing a word.

3. In combination, a memory member having a plurality of positions for the storage of bits of signal information subdivided into words and word sections and for sequentially presenting the bits of signal information for computation, a register for receiving from the memory member bits of signal information representing words, a gate for providing when opened a passage of signal information from the memory member to the register, means in the register for receiving word sections of signal indications representing in coded form the particular number of words to be counted for sequential presentation by the memory member before any further passage of words of signal information into the register and for providing a signal upon the completion of the count, means for initiating a count of the words by the counting means in the register, means controlled by the signal representing the completion of the count for opening the gate for the passage from the memory means into the register of a plurality of bits of signal information representing a particular word, and means for closing the gate upon the completion of the passage from the memory means into the register of the bits of signal information representing the particular word.

4. In combination, a memory member for storing a plurality of bits of signal information subdivided into words and word sections and for sequentially presenting the words and word sections for computation, a register for receiving word sections of signal information from the memory member and for passing signal information back to the register, means including gating means and electrical circuitry in the register for selecting particular words for passage from the memory member into the register, means including second gating means and electrical circuitry in the register for selecting particular word sections for passage from the register to the memory member, and means including the first and second gating means for decoding the signal information in the register and for applying the decoded information to the memory member at the time of the particular word sections and at selected positions in the memory member.

5. In combination, a memory member for storing a plurality of bits of signal information subdivided into words and word sections and for sequentially presenting the bits of signal information for use, a register for receiving bits of signal information representing words and for passing selective signal information back to the memory member for recordation by the memory member, first gating means for providing upon becoming opened for the passage from the memory member into the register of signal information representing a word, means including electrical circuitry in the register for counting the number of words being presented by the memory member for use to open the first gating means after a first particular number of words in accordance with the coded information in first particular word sections in the register, means including second gating means for closing the first gating means after the passage from the memory member into the register of the signal information representing a word, means for decoding the signal information in second particular word sections in the register and for retaining the decoded information for transfer to the memory member, third gating means for providing upon becoming opened for the passage of a signal to obtain a transfer of the decoded information from the decoding means to the memory member, and means including electrical circuitry in the register for counting the number of words being presented by the memory member for use to pass a signal through the third gating means after a second particular number of words in accordance with the coded information in third particular word sections in the register.

6. In combination, a memory member for storing a plurality of bits of signal information subdivided into words and word sections and for sequentially presenting the signal bits for computation, means including a register and gating means for passing into the register selective words of signal information, means including a decoder for operating upon the signal information representing first particular word sections in the register to decode the information and for storing the decoded information for subsequent transfer to the memory member, means in the register for counting the number of words after the storage of the signal information in the register and for providing a control signal after a particular count dependent upon the signal information in second particular word sections in the register, and gating means triggered by the control signal from the register to obtain a transfer of the decoded information to the memory member.

7. In combination, a memory member for storing a plurality of bits of signal information grouped into words and word sections and for sequentially presenting the bits of signal information for computation, a register for receiving particular words from the memory member in accordance with the information coded into the bits of signal information representing first particular word sections, first means for decoding the signal information in second particular word sections in the register to provide signal information for transfer to the memory member, means in the register for counting the words being presented by the memory member for computation and for providing a control signal upon the occurrence of a particular count dependent upon the signal information in third particular word sections in the register, gating means associated with the first decoding means for providing for the transfer of the decoded signal information to the memory member upon the occurrence of the control signal, and second means for decoding the signal information in fourth particular word sections in the register to obtain a transfer to particular positions in the memory member of the signal information passing to the memory member.

8. In an electronic digital computer including a cyclically operable storage element having a plurality of divisions in which are storable a plurality of words, respectively, and a transducing element for reading words out of or writing words into the storage element, the divisions of the storage element being sequentially available at the transducing element, a first division containing an order to be read, a first portion of the order specifying the operation to be performed by the computer, and a second portion of the order specifying the address of a second division to be used in the specified operation, the address of the division containing the order being specified by the number of divisions between a reference point and the division containing the order, the reference point being the point in the storage element available at the transducing element at the completion by the computer of the operation immediately preceding the specified operation, an automatic program control system for controlling the sequence of steps involved in performing the specified operation, said system comprising: an electronic word storage register including a number storing-and-counting section and an order storing-and-counting section; first means electrically coupled to said order section for initially setting said order section to a count proportional to the address of the order to be read; second means for actuating said order section to count the number of divisions passing the transducing element, said second means being operable upon completion of the immediately preceding operation of the computer; third means electrically coupled to said storage register for applying a word being read by the transducing element to said storage element, said third means being electrically coupled to said order section and operable when said order section attains a predetermined count whereby said third means applies the order to be read to said storage register; fourth means electrically coupled to said number section for actuating said number section to count the number of divisions passing the transducing element, said fourth means being operable upon completion of the application of the order being read to said storage register; and fifth means electrically coupled to said number section for producing an electrical output signal when said number section attains a predetermined count.

9. The control system defined in claim 8, wherein said storage register includes an operation storing section, the first portion of the order to be read being applied to said operation section.

10. The control system defined in claim 9, which further includes an electrical operation decoder electrically coupled to said operation section for producing an electrical output signal representing the operation to be performed, and sixth means electrically coupled between said decoder and said fifth means for applying the electrical signal produced by said fifth means to said decoder to actuate said decoder.

11. The control system defined in claim 8, wherein said storage register is a shifting register, and said third means includes means for shifting the order to be read into said storage register.

References Cited in the file of this patent
UNITED STATES PATENTS

| | | |
|---|---|---|
| 2,500,294 | Phelps | Mar. 14, 1950 |
| 2,540,654 | Cohen | Feb. 6, 1951 |
| 2,574,283 | Potter | Nov. 6, 1951 |